(12) United States Patent
Reinhardt et al.

(10) Patent No.: US 6,378,396 B1
(45) Date of Patent: Apr. 30, 2002

(54) WELDED CRANKSHAFT

(75) Inventors: Rudolf Reinhardt, Esslingen; Hans Zechmann, Kernen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/516,918

(22) Filed: Mar. 1, 2000

(51) Int. Cl.$^7$ .............................................. F16C 3/04
(52) U.S. Cl. .................... 74/595; 29/888.08; 123/196 R
(58) Field of Search .......................... 74/595, 597, 598, 74/605; 123/196 R; 29/428, 888.08

(56) References Cited
FOREIGN PATENT DOCUMENTS
EP          0 530 890          3/1993

Primary Examiner—David A. Bucci
Assistant Examiner—Chong H. Kim
(74) Attorney, Agent, or Firm—Kenyon & Kenyon (57) ABSTRACT

A welded crankshaft having a number of individual elements and cavities formed in the region of the main bearing journals and crank journals. The individual elements are configured so that oil passages in the overlap region between the main bearing journals and crank journals run substantially in the axial direction, and transition via radial orifices directly into the journal surface. The cavities of the main bearing journals and crank journals can be made very large, so that the weight of the crankshaft is kept light. In addition, because of the simple geometry of the oil passages, the crankshaft can be manufactured in modular fashion from the individual elements.

10 Claims, 7 Drawing Sheets

WELDED CRANKSHAFT

FIELD OF THE INVENTION

The present invention relates generally to a welded crankshaft having a number of individual elements and having cavities in the region of the main bearing journals and crank journals.

RELATED TECHNOLOGY

European Patent Document No. EP 0 090 013 B1 describes an assembled crankshaft whose individual elements each comprise a crank web having tubular segments shaped onto both sides. The individual elements are welded to one another in the region of the main bearing journals and crank journals, yielding a crankshaft whose crank journals and main bearing journals contain cavities in their interiors. This results in a considerable weight reduction compared to conventional crankshafts. In order to lubricate the bearings, oil lines that are constituted by inserted tubular lines which terminate via orifices on the outer peripheries of the journals, and are connected to one another via passages in the interior of the crankshaft, are provided in the cavities of the crank journals and main bearing journals. These oil lines make possible a directed oil flow with minimum oil volume, which provides sufficient lubrication of the bearing regions. This carries the risk, however, that the inserted tubular lines may detach during operation and damage the bearings. In addition, this type of oil guidance system via inserted small tubes is very complex to manufacture and assemble.

European Patent Document No. EP 0 090 013 B1 also describes a crankshaft in which the crank journals and main bearing journals are joined to one another by an oblique orifice. The result of this, however, is to make the cavities smaller, since additional material through which these orifices are guided must be provided in the interior of the individual elements. This diminishes the weight saving achieved by way of the cavities.

German Patent Document No. DE 195 36 349 C1 describes a friction-welded crankshaft that also has cavities in the interiors of the main bearing journals and crank journals. In this case delivery of lubricating oil along the shaft is accomplished via additional cavities that are configured in the journal region partially as annular spaces, and that are connected to one another via oil passages. A directed and effective oil flow in the regions of the bearings can thereby be ensured. However, the oil flows around the friction-welded seams in the region of the annular spaces, so that residual particles can be entrained into the oil circulation system. In addition, the wall thicknesses are kept relatively thin in configuring the double cavities, which results in a low geometrical moment of inertia for the weld surface, and accordingly in a weaker join between the individual elements.

SUMMARY OF THE INVENTION

It is an object of the present invention to provide an assembled crankshaft that is hollow in the journal region, while maintaining simplicity of manufacture, in such a way that on the one hand weld surfaces with a large geometrical moment of inertia are created between the individual elements, and on the other hand a directed oil flow for lubricating the bearings is ensured, without bringing the oil into contact with welding burr. At the same time, the lowest possible weight is to be achieved.

The present invention provides a welded crankshaft including a number of individual elements which each include a crank web having tubular segments shaped onto both sides, and are welded to one another in such a way that the tubular segments of adjacent individual elements together form main bearing journals and crank journals which respectively contain weight-reducing cavities in their interiors, the main bearing journals and crank journals each partially overlapping one another radially. The crankshaft is furthermore equipped with oil passages which include axial orifices that run substantially in the axial direction of the crankshaft, and which furthermore include radial orifices that connect the axial orifices to the journal surfaces. The oil passages (10), with the exception of the outlet openings of the radial orifices (12,13), lie completely in the overlap region (15) of the main bearing journals and crank journals (6,7), and the walls of the tubular journals (6,7) are of cavity-free configuration aside from the oil passages (10).

According to the present invention, the oil passages are implemented by orifices that run substantially in the axial direction in the overlap region between the main bearing journals and crank journals, and that transition via a radial orifice directly into the journal surface. Very little manufacturing and assembly effort is required for this, and the oil passages are free of contaminating welding burrs. The tubular journals are moreover of solid configuration, i.e., have no cavities aside from the oil orifice, so that the weld surfaces between the individual elements are particularly large and the strength and weight of the crankshaft are optimized. The weight-reducing cavities, however, can be configured at optimum size.

According to the present invention, the radial oil supply lines are located on the centrifugally inner side, overcoming the prejudice that oil delivery along the centrifugal force vector is necessary for proper lubrication. This aspect of the present invention stands in contrast to the crankshafts described in German Patent Document No. DE 195 36 349 C1 and European Patent Document No. EP 0 090 013 B1, whose oil supply lines each terminate on the centrifugally outer side of the crank journals.

BRIEF DESCRIPTION OF THE DRAWINGS

The present invention is explained in further detail below with reference to the drawings, in which.

DETAILED DESCRIPTION

Figure 1:
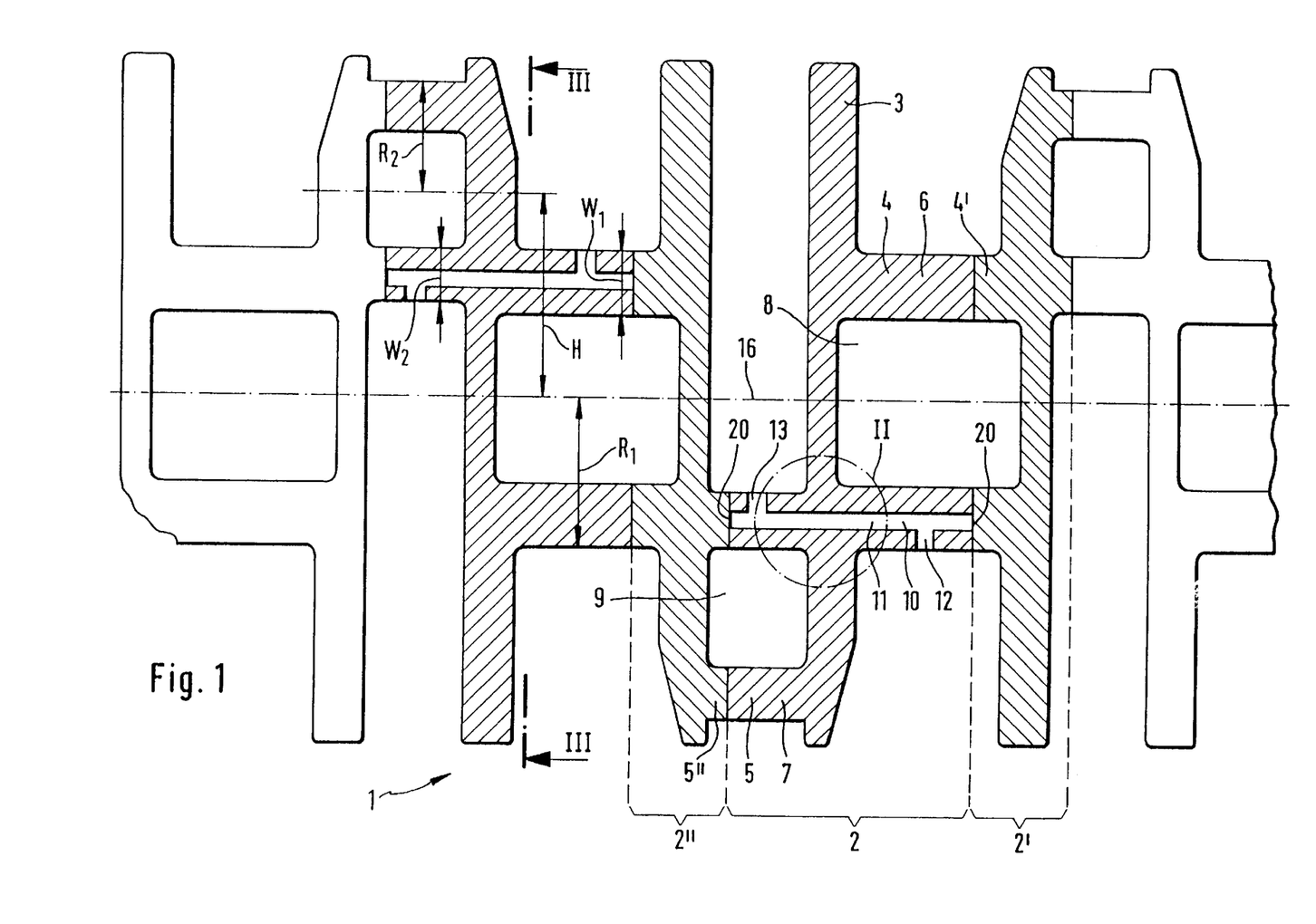
FIG. 1 shows a lateral section through the crankshaft of an in-line engine.

FIG. 1 shows a portion of a crankshaft 1 for an in-line engine, which is assembled from multiple individual elements 2. The number of individual elements is defined by the number of cylinders of the engine in question. Each individual element 2 comprises a crank web 3 with tubular segments 4 and 5 shaped onto both sides, and is joined to the adjacent individual elements 2' and 2" in such a way that the assembled tubular segments 4 and 4' and 5 and 5" together form main bearing journals 6 and crank journals 7, which contain cavities 8 and 9 in their respective interiors.

In order to deliver lubricating oil from main bearing journals 6 to crank journals 7, every second individual element 2 contains an oil passage 10 that comprises an axial orifice 11 into which open two radial orifices 12, 13 that proceed centeredly from the outer sides of the crank journals and main bearing journals. Tubular segments 4, 4' and 5, 5" of adjacent individual elements 2, 2', 2" are alternatingly of different lengths, so that weld beads 14 between individual elements 2, 2', and 2" are offset with respect to the journal centers, and thus each oil line 10 runs completely inside a single individual element 2.

Figure 2:
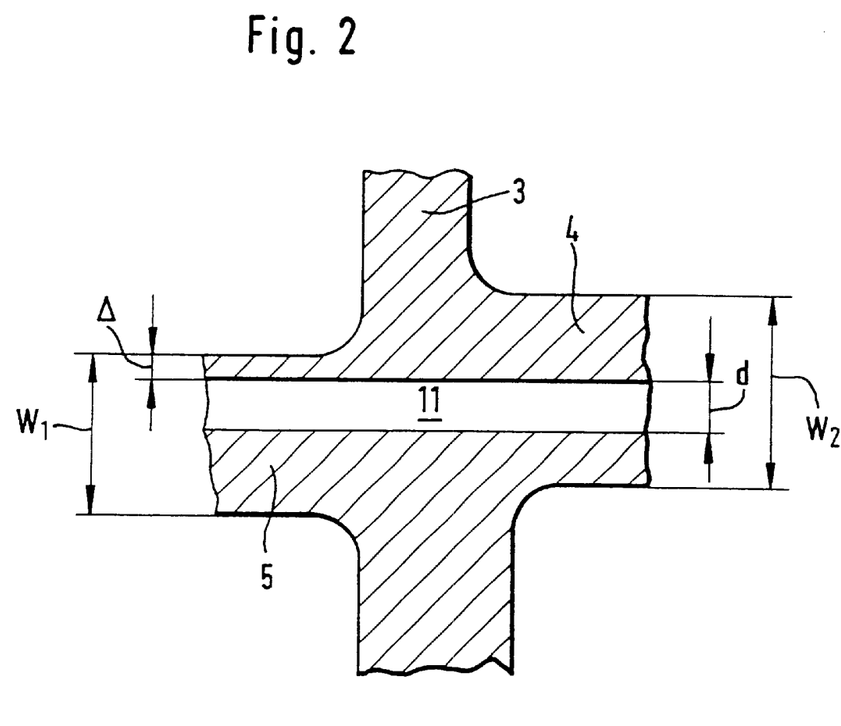
FIG. 2 shows a detail view of the oil passage of FIG. 1.

The feasibility of an axial orifice 11 which passes through the entire length of individual element 2 results in certain limitations in the dimensioning of the crankshaft. In approximate terms, the axial arrangement 11 of oil passages 10 requires that crank journal 7 and main bearing journal 6 have a radial overlap region 15 (shown cross-hatched in FIG. 3) which is large enough to accommodate the oil passage. This results in the following:

1) wall thicknesses $W_1$ and $W_2$ of the tubes of which main bearing journals 6 and crank journals 7 are constructed must be larger than diameter d of axial orifice 11, i.e., $W_1$, $W_2 > d + 2\Delta$, $\Delta$ being the minimum required wall thickness of the oil passage (see FIG. 2); and 2) stroke H of the crankshaft must not exceed a maximum value $H_{max} = R_1 + R_2 - d - 2\Delta$, $R_1$ and $R_2$ being the radii of main bearing journal 6 and crank journal 7, d the diameter of axial orifice 11, and $\Delta$ the minimum required wall thickness for the oil supply line (see FIG. 1).

Figure 3A:
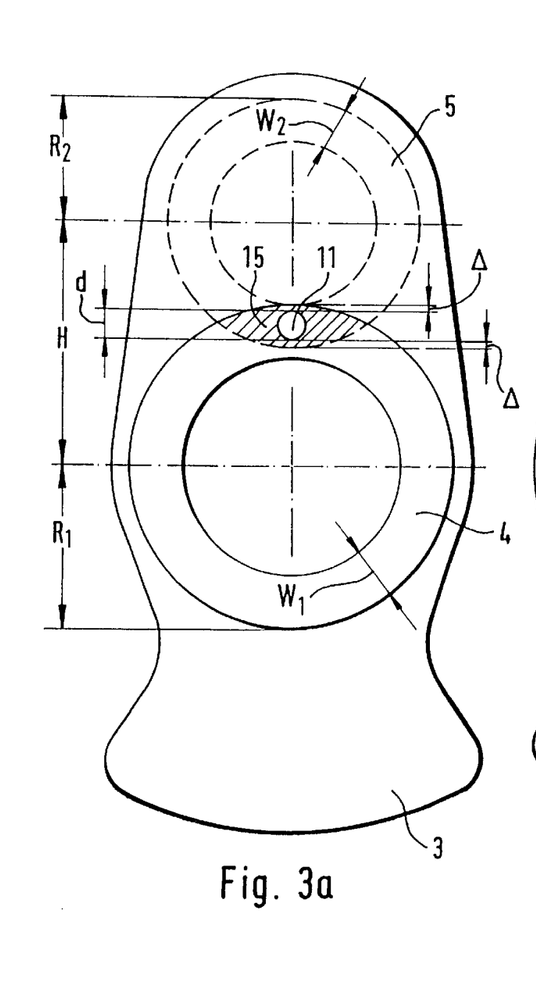
FIG. 3 shows an axial view or plan view of the radial overlap region between the main bearing journal and crank journal along line III—III in FIG. 1, in FIG. 3a for stroke $H=H_{max}$, in FIG. 3b for a shorter stroke $H<H_{max}$, and in FIG. 3c for an even shorter stroke $H<<H_{max}$.
Figure 3B:
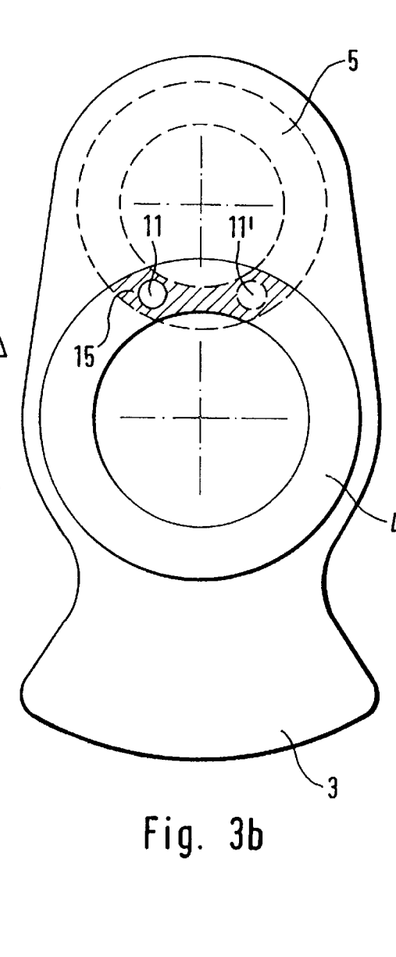
Figure 3C:
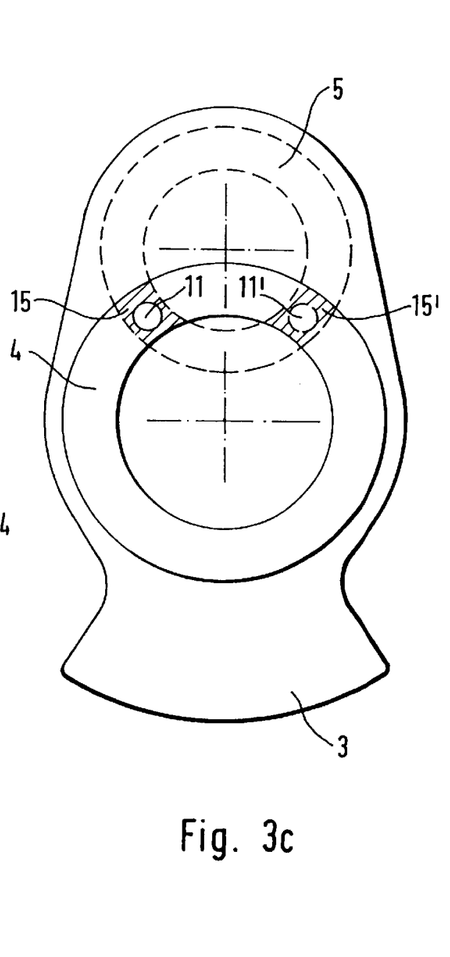

At the maximum possible stroke $H = H_{max}$, axial orifice 11 of oil passage 10 runs, as shown in FIG. 3a, along overlap region 15 (which in this case is minimal) of main bearing journal 6 and crank journal 7. At shorter strokes $H < H_{max}$ of the shaft, overlap region 15 becomes larger (FIG. 3b). At even shorter strokes $H << H_{max}$, as shown in FIG. 3c, two discontinuous overlap regions 15' and 15" are created between main bearing journal 6 and crank journal 7; in this case axial orifice 11, 11' can selectably be housed in one of the two regions.

The manufacturing procedure is preferably configured so that axial passage 11 and the two radial passages 12, 13 are drilled or electrodischarge machined into the individual elements, which are largely premachined to final dimensions, before the latter are welded to one another. As is apparent from FIG. 1, the result of the welding operation is that axial orifice 11 is closed off at both of its ends 20 by the adjacent individual elements 2', 2", creating a separate and sealed oil line 10 which joins main bearing journal 6 and crank journal 7. The shaft can thus be assembled in modular fashion from easy-to-manufacture individual elements 2, 2'; metal-cutting machining of the completely assembled shaft is superfluous, except for the final precision machining of the bearing surfaces. This results in a reduction in the number of manufacturing steps as compared to previously used methods, and moreover results in a simple and robust structure for the crankshaft. Fitting together the individual elements by friction welding offers the additional advantage that a broad spectrum of materials, including, in particular, different materials, can be welded to one another with this method, and the crankshaft can thus be constructed specifically from the most suitable materials.

Figure 4:
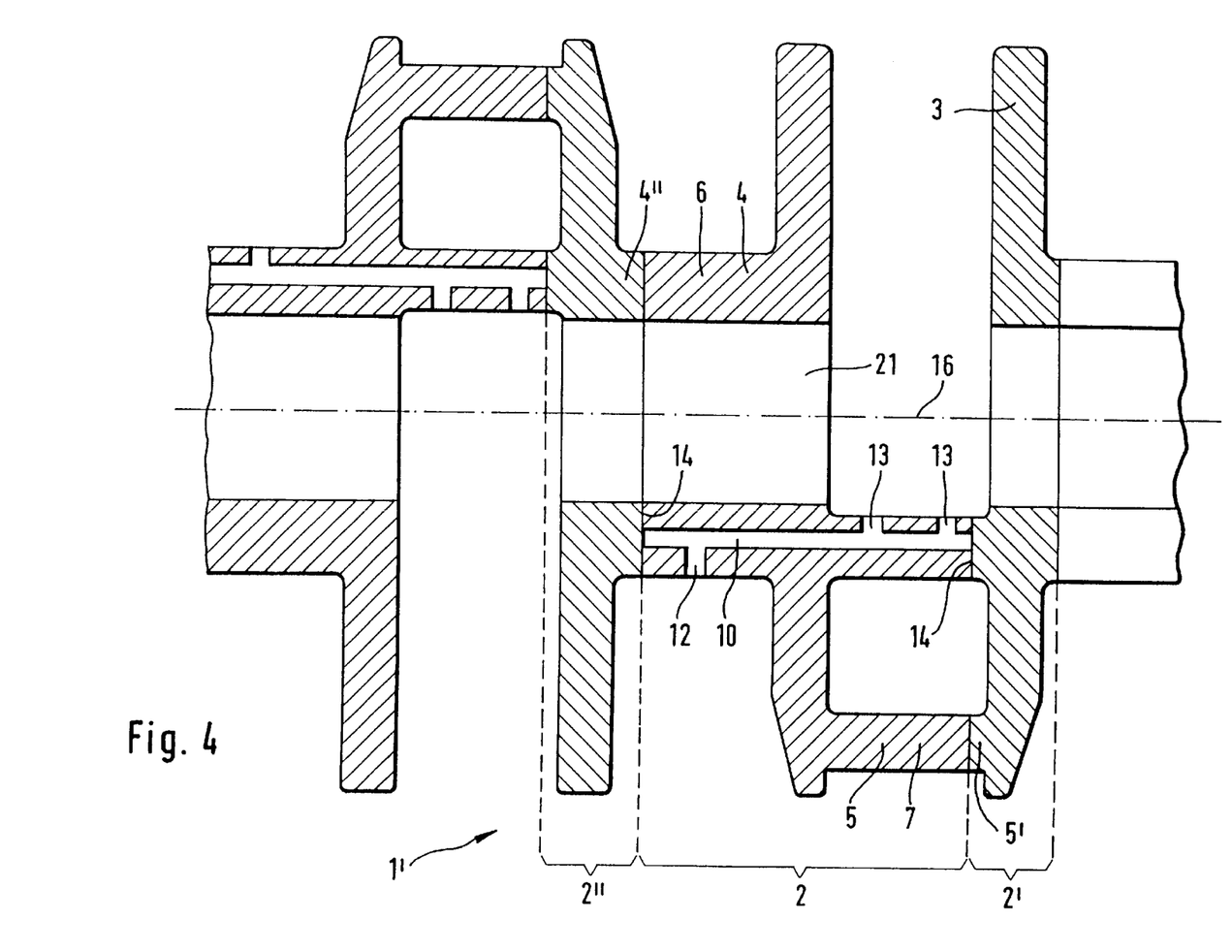
FIG. 4 shows a lateral section through the crankshaft of a V-engine with single-side oil passages.

FIG. 4 shows an exemplary embodiment of a crankshaft 1' for V-engines. The difference as compared to the crankshaft shown in FIG. 1 is the fact that here, two connecting rods engage on each crank journal 7. Correspondingly, two oil outlets 13 also terminate on each crank bearing journal. For oil delivery, by analogy with crankshaft 1 for in-line engines (FIG. 1), in this case each second individual element 2 contains an oil passage 10 that comprises an axial orifice into which three radial orifices 12, 13 open. Orifice 12 proceeds centeredly from the main bearing journal, while orifices 13 proceed from the connecting-rod bearings. Tubular segments 4, 4" and 5, 5' of adjacent individual elements 2, 2', 2" are alternatingly of different lengths; as a result, weld beads 14 between individual elements 2, 2', 2" are offset with respect to the journal center, and each oil line 10 runs completely inside a single individual element 2. The process steps for manufacturing this crankshaft are analogous to those of the crankshaft for in-line engines described above.

Figure 5:
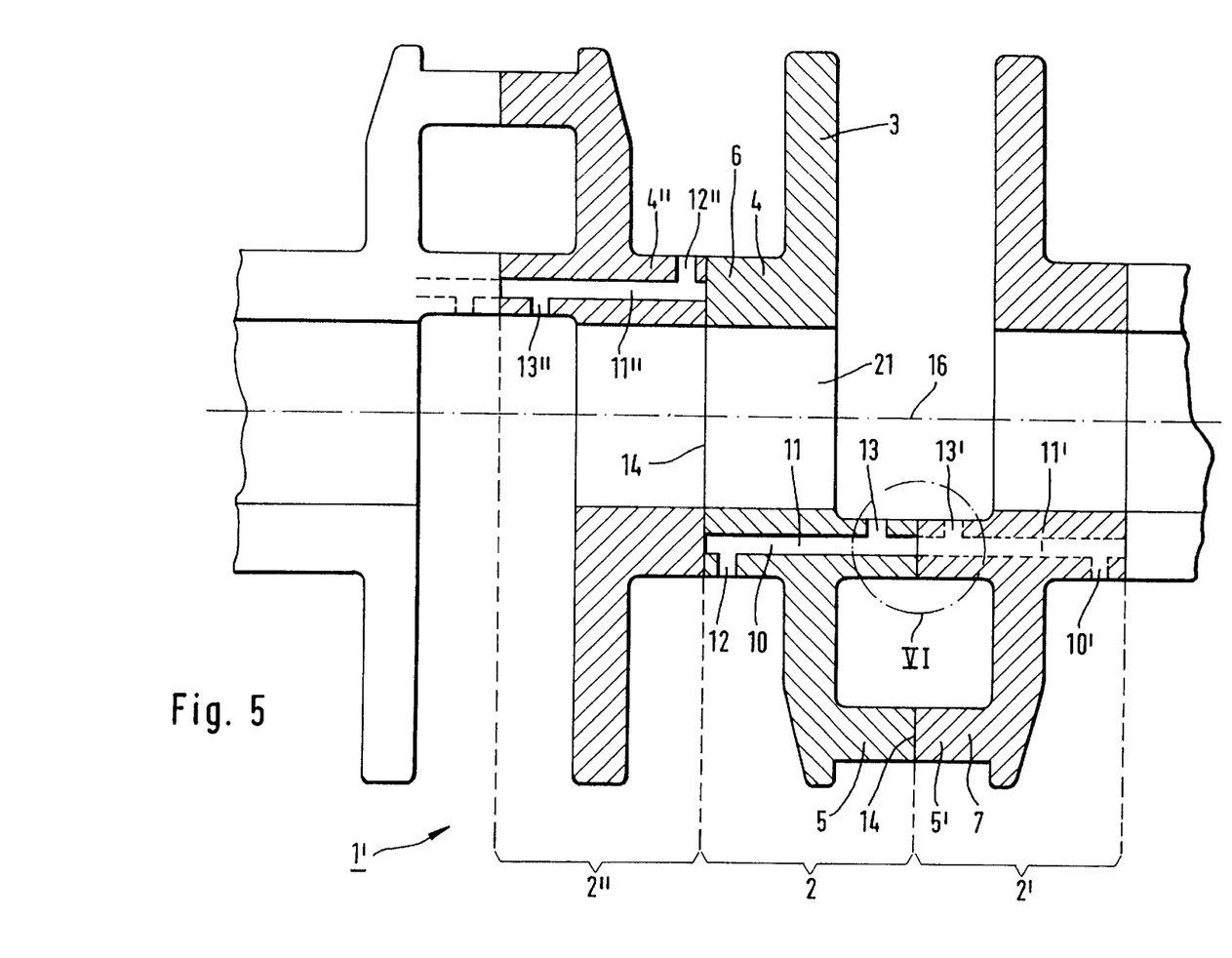
FIG. 5 shows a lateral section through the crankshaft of a V-engine with double-side oil passages.

In the embodiment depicted in FIG. 4, lubrication of the two connecting-rod bearings takes place via the same oil line 10 and a common inlet 12. This entails the risk, especially with narrow oil lines 10, that too little lubricating oil might be delivered to outlet 13 located farther away from inlet 12, and that inhomogeneous lubrication of the two connecting rods might occur if the two orifices 13 have the same radius. An embodiment which overcomes these potential disadvantages is depicted in FIG. 5. Here two oil passages 10, 10' are provided in each crank journal, supplying the two bearings with lubricant via outlets 13, 13' independently of one another. Two oil passages, whose discharge openings are offset radially by an angle that is determined by the arrangement of the cylinders, accordingly also terminate on each main bearing journal. In this instance tubular segments 4, 4" and 5, 5' of adjacent individual elements 2, 2', 2" are of equal length, so that weld beads 14 are arranged centeredly on main bearing journal 6 and crank journal 7.

A further advantage of this embodiment for V-engines is the fact that the crankshaft can be built up from identical individual elements, so that manufacturing costs can be reduced. Production proceeds in a manner similar to that described above for the in-line engine: first, axial passage 11 and the two radial passages 12, 13 are drilled into each individual element 2. Then the individual elements are welded to one another. Welding causes the axial orifice to be closed off at the ends by the adjacent individual elements. In order to achieve uniform lubricating oil delivery to the crank bearings, it may be advantageous, in particular, for the two oil passages 10, 10' that end on one crank journal 7 also to be separated from one another. This can be achieved in various ways, depending on the geometry of the crankshaft. If stroke H of the crankshaft is short ($H << H_{max}$), then main bearing journal 6 and crank journal 7 possess, as shown in FIG. 3c, two discontinuous overlap regions 15 and 15' in which axial orifices 11, 11' of the two oil passages 10, 10' can be housed. In the course of welding of the double elements in the region of the crank journals, each axial orifice 11, 11' is then respectively closed off at its end by the adjacent double element, thereby creating automatically closed oil supply lines 10, 10' that connect main bearing journal 6 and crank journal 7.

Figure 6A:
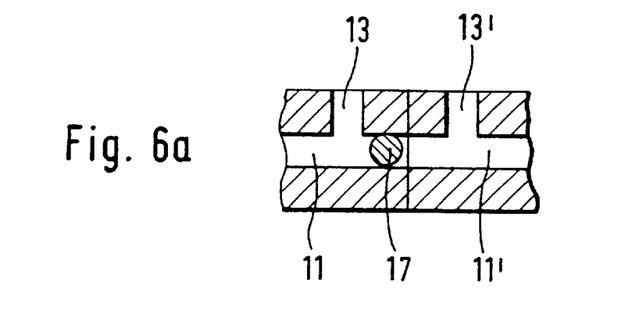
FIG. 6 shows a detail view of the oil passages in the region circled in FIG. 5, in FIG. 6a with a spherical insert, in FIG. 6b with a cylindrical insert, in FIG. 6c with a weld bead.
Figure 6B:
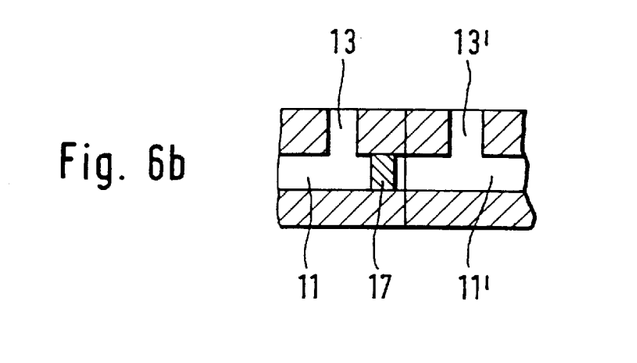
Figure 6C:
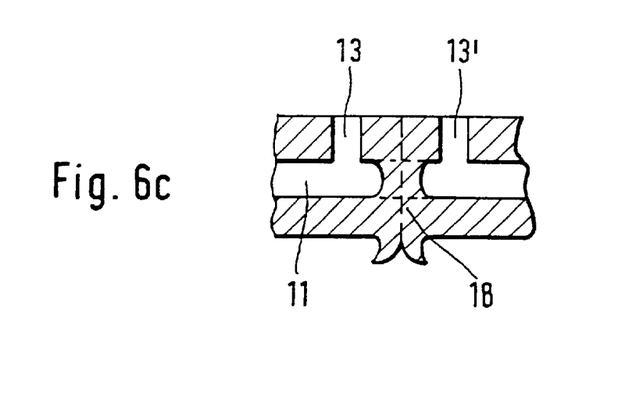

Similarly, with shorter strokes $H < H_{max}$ for the shaft, the two axial orifices 11, 11' can be guided next to one another in overlap region 15 (FIG. 3b). With the maximum possible stroke, however ($H=H_{max}$; FIG. 3a), the overlap region is so small that axial orifices 11, 11' transition directly into one another. In order to seal off the oil passages from one another in this case as well, a spherical (FIG. 6a) or cylindrical (FIG. 6b) insert 17 is pressed into axial orifice 11 before the double elements are welded. Alternatively (FIG. 6c), the closure can be produced by the weld itself, if the method used (e.g., friction welding) creates a ridge 18 that interrupts axial orifices 11, 11' in the weld region.

Figure 7:
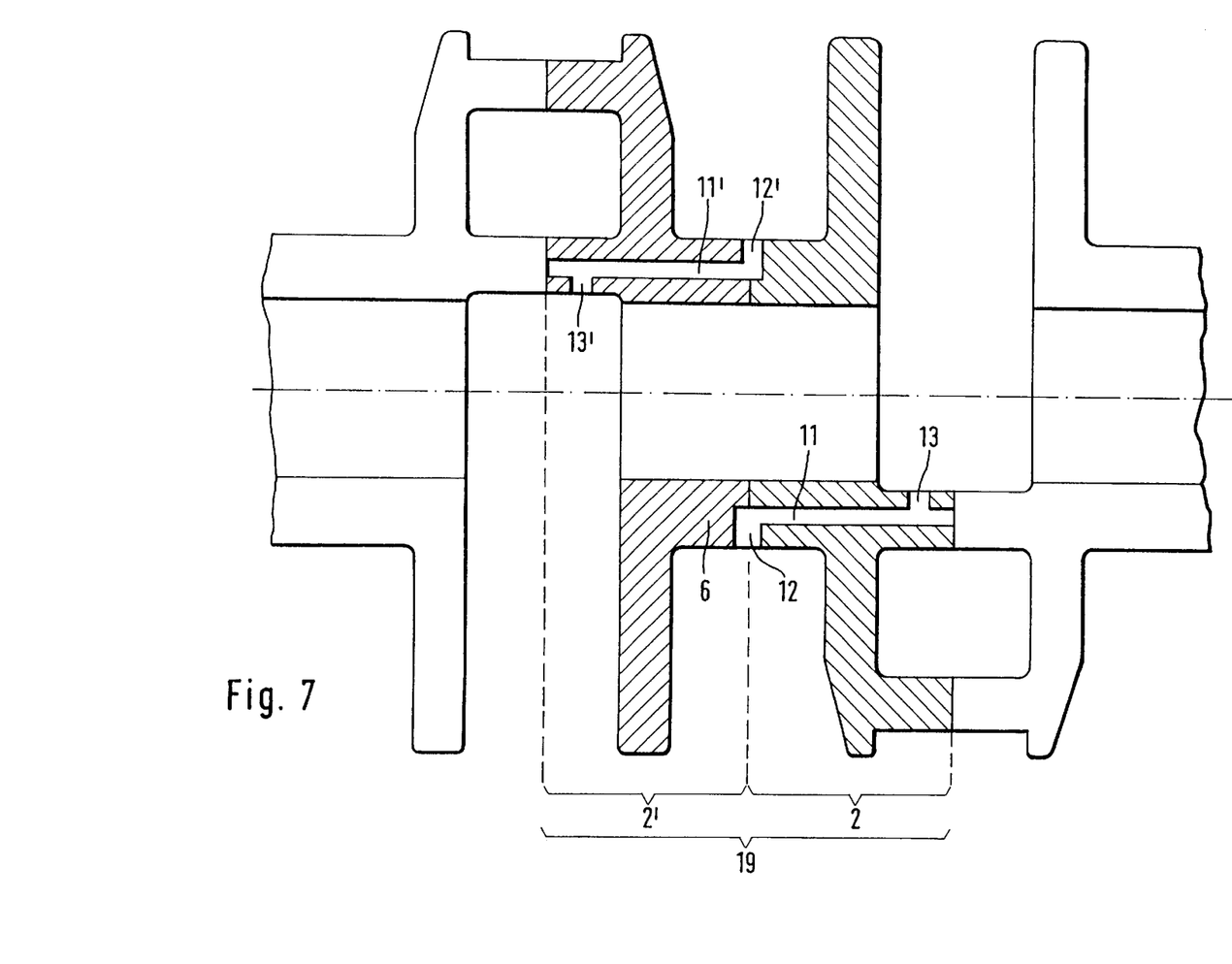
FIG. 7 shows a lateral section through a portion of the crankshaft having centeredly positioned radial orifices in the main bearing journal.

In the exemplary embodiment depicted in FIG. 5, inlet openings 12, 12" of the oil passages are located not centeredly on main bearing journal 6, but rather slightly offset to the side. This has the advantage in terms of production engineering that, as described above, individual elements 2 can be completely equipped with the oil supply lines before they are welded to one another. Oil delivery from the crankcase, however, usually is accomplished centeredly to the main bearing journals. It may therefore be advantageous also to position inlet openings 12, 12', as shown in FIG. 7, centeredly on the main bearing journals. In this case the manufacturing procedure is advantageously configured so that first of all each two adjacent individual elements 2, 2" are welded to one another in the region of main bearing journal 6. The two axial passages 11, 11' and the total of four radial passages 12, 12', 13, 13' are then drilled into the resulting double element 19, the orifices being applied centeredly, i.e., in the region of the weld bead, onto the main bearing journals. Lastly, double elements 19 are welded together to form crankshaft 1.

The weight of the crankshaft can be further reduced if, as shown in FIGS. 4 and 5, crank webs 3 are equipped in the region of principal axis 16 with through holes 21, so that cavities 8 of main bearing journals 6 are open on both sides. For stability reasons, this through hole 21 should preferably not exceed the inside diameter of main bearing journal 6.

What is claimed is:

1. A welded crankshaft comprising:
    a plurality of elements each including a crank web, each crank web including a first side and a second side, a first tubular segment being disposed on the first side, a second tubular segment being disposed on the second side, a first of the plurality of elements being welded to a second of the plurality of elements so that the first tubular segment of the first element forms a main bearing journal with the first tubular segment of the second element, the second element being welded to a third of the plurality of elements so that the second tubular segment of the second element forms a crank journal with the second tubular segment of the third element, the main bearing journal and the crank journal each including interior weight-reducing cavities, the first and second and third elements together defining an axial direction and a radial direction, the main bearing journal partially overlapping the crank journal radially, at least one of the first and second and third elements defining at least one oil passage, the at least one oil passage including a first axial orifice, a first radial orifice and a second radial orifice for providing fluid communication between the axial orifice and a respective journal surface of the main bearing journal and the crank journal at a respective outlet opening of the first radial orifice and the second radial orifice, the axial orifice having an orifice axis aligned substantially parallel to the axial direction, the at least one oil passage, with the exception of the outlet openings, being disposed completely in the region of overlap of the main bearing journal and the crank journal, the main bearing journal and the crank journal including a plurality of respective walls, each of the plurality of respective walls having substantially no cavities besides the at least one oil passage.

2. The crankshaft as recited in claim 1 wherein the first and second elements and the second and third elements are welded to one another using a friction weld.

3. A welded crankshaft comprising:
    a plurality of elements each including a crank web, each crank web including a first side and a second side, a first tubular segment being disposed on the first side, a second tubular segment being disposed on the second side, a first of the plurality of elements being welded to a second of the plurality of elements so that the first tubular segment of the first element forms a main bearing journal with the first tubular segment of the second element, the second element being welded to a third of the plurality of elements so that the second tubular segment of the second element forms a crank journal with the second tubular segment of the third element, the main bearing journal and the crank journal each including interior weight-reducing cavities, the first and second and third elements together defining an axial direction and a radial direction, the main bearing journal partially overlapping the crank journal radially, at least one of the first and second and third elements defining at least one oil passage, the at least one oil passage including a first axial orifice and at least one radial orifice for providing fluid communication between the axial orifice and at least one respective journal surface of the main bearing journal and the crank journal at a respective outlet opening of the at least one radial orifice, the axial orifice having an orifice axis aligned substantially parallel to the axial direction, the at least one oil passage, with the exception of the outlet openings, being disposed completely in the region of overlap of the main bearing journal and the crank journal, the main bearing journal and the crank journal including a plurality of respective walls, each of the plurality of respective walls having substantially no cavities besides the at least one oil passage;
    wherein the first axial orifice includes a first and a second end, the first axial orifice being closed off at each of the first and second ends.

4. The crankshaft as recited in claim 3 wherein the second element defines a first one of the at least one oil passage and the third element defines a second one of the at least one oil passage, the first oil passage including the first axial orifice, the second oil passage including a second axial orifice, the second axial orifice including a third and a fourth end, the second axial orifice being closed off at the third and the fourth ends, the first and second axial orifices being disposed with an angular offset and/or radial offset relative to one another so that the first axial orifice is closed off at the first end by the third element and the second axial orifice is closed off at the fourth end by the second element.

5. The crankshaft as recited in claim 3 wherein the first axial orifice is closed off at least one of the first and second ends using a respective pressed-in insert.

6. The crankshaft as recited in claim 5 wherein the pressed-in insert includes at least one of a ball, stud and plate.

7. The crankshaft as recited in claim 3 wherein the first axial orifice is closed off at least one of the first and second ends using a weld.

8. The crankshaft as recited in claim 1 wherein the first and second and third elements are formed from parts having a same shape so that a first interface between the first and second elements is axially centered on the main bearing journal and a second interface between the second and third elements is axially centered on the crank and the main bearing journal includes a first and a second one of the at least one radial orifice and the crank journal includes a third and a fourth one of the at least one radial orifice.

9. The crankshaft as recited in claim 1 wherein the first tubular segment of the first element has a different length than the first tubular segment of the second element so that a first interface between the first and second elements is axially offset from an axial center of the main bearing journal and the second tubular segment of the second element has a different length than the second tubular segment of the third element so that a second interface between the second and third elements is axially offset from an axial center of the crank journal, the main bearing journal including at least a first one of the at least one radial orifice, the crank journal including at least a second one of the at least one radial orifice.

10. The crankshaft as recited in claim 1 wherein the main bearing journal defines a principal axis and each crank web defines a respective through hole in a region of the principal axis, a diameter of each respective through hole being not larger than an inside diameter of the main bearing journal.

* * * * *